H. Barber,
Making Wooden Trays.

Nº 80,382. Patented July 28, 1868.

Witnesses:
R. S. Turner
J. S. Brown

Inventor:
Henry Barber

United States Patent Office.

HENRY BARBER, OF GREENFIELD, MASSACHUSETTS.

*Letters Patent No. 80,382, dated July 28, 1868.*

IMPROVEMENT IN MACHINES FOR MAKING WOODEN TRAYS.

*The Schedule referred to in these Letters Patent and making part of the same.*

TO ALL WHOM IT MAY CONCERN:

Be it known that I, HENRY BARBER, of Greenfield, in the county of Franklin, and State of Massachusetts, have invented a new and useful Improvement in Machines for Making Wooden Bowls or Trays; and I do hereby declare the following to be a full, clear, and exact description of the same, reference being had to the accompanying drawings, in which—

Figure 1:
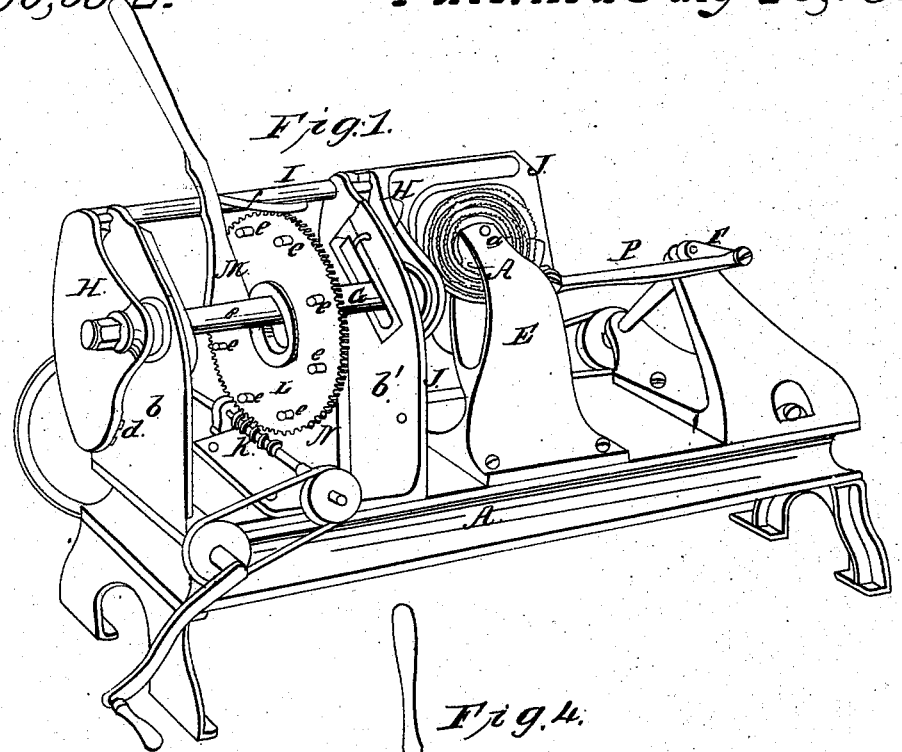
Figure 4:
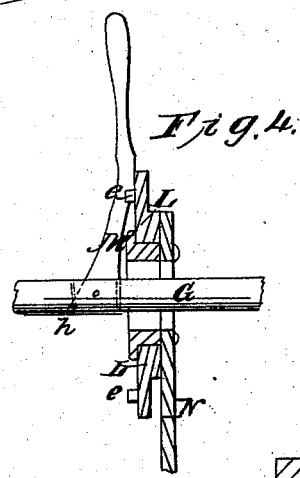
Figure 2:
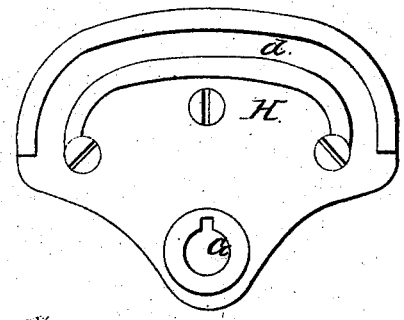
Figure 3:
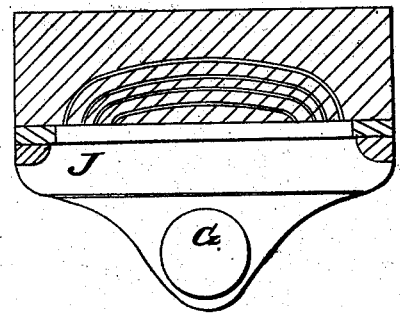

Figure 1 is a perspective view of my machine.
Figure 2 is an elevation of one of the guide-plates detached.
Figure 3 is a longitudinal sectional elevation of the carriage with bolt attached.
Figure 4 is vertical section of worm-wheel and standard.

My invention consists in an improvement in the manner of making oval trays or bowls of wood, by means of which they are sawed out from the block in nests of three or more, as desired; and in order that others may understand the construction and operation of my machine, I will proceed to particularly describe it.

In the drawings, A is a stout frame, of wood or metal, of proper length and height, on the upper surface of which are the standards or supports of the carriage, the saws C C, &c., and the mechanism for working the same. The saws C C are made of plates of steel, bent around a central point, $a$, forming concentric rings at equal distances apart, and the ends firmly attached to the plate D.

This plate D is, in form, a segment of about one-fifth part of a circle, and is pivoted at its centre, $a$. It has upon one surface grooves cut of a depth sufficient to receive the ends of the saws, and in which they are confined. Upon the circumference of the plate D is a lug, $o$, to which one end of the connecting-rod or pitman, P, is attached by suitable means.

The saws C C are supported between the two arms of the standard E, on the bolt $a$, which serves as a pivot. Motion is communicated by the crank F and a series of pulleys, or in any other suitable method.

The carriage is supported by the standards $b\ b'$, which rise from the frame A, at right angles, and turn forward, so that the slots $c\ c'$ shall be in the same plane as the saws C C. Through these slots passes the shaft G, to the ends of which the guide-way pieces H H are attached. Through the ends of the standards $b\ b'$ is passed the rod I, the ends projecting a little distance beyond the standards into the guide-way grooves $d\ d$. These guide-ways, $d\ d$, have the same curve that the intended tray or bowl is to have, taking a longitudinal section, while the cross-section is circular, and they can be made of any desired curve.

To the guide-way piece H', and on the outer surface, is secured the carriage J, on which the block to be cut into trays is placed. The plate which forms the carriage J has an elliptical opening in it, which permits the saws C C to pass in and beyond, as the carriage is turned upon the shaft G as a centre.

The worm-screw K, working in the cogs on the periphery of the wheel L, gives to it a slow motion, which is communicated to the carriage by means of the lever M, which is attached to the shaft G, and turns the carriage, when it is so placed as to be caught by any one of the pins $e\ e$ on the surface of the wheel L. This wheel L is supported by the standard N, which is slotted to allow the shaft G to pass through it, and at the same time it permits a limited motion to the shaft G in the line of the slots in the standards $b\ b'$. On the inner face of this wheel, at equal distances from one another and the centre of the wheel, are the pins $e\ e$, which serve to retain the lever M while the machine is in operation. As the wheel L revolves slowly, it carries this lever with it, and the carriage also, until the lever M reaches the "let-off" stop $f$ inserted in the rod I, which, being bent the proper form, turns the lever M from under the pin $e$ just before it reaches the rod I, and as the block on the carriage passes beyond the saws C C.

The lever M has the end entering the shaft G notched, and there is a spring, $h$, which holds the lever in its place, when it is pressed up against the face of the wheel L.

The operation of the whole machine is very simple and readily understood.

The block to be cut into trays being secured to the carriage J, when in a horizontal position the lever M is placed against the wheel L, so that one of the pins $e$ will catch it as the wheel revolves. As the pin $e$ strikes the lever M, the carriage J is started and guided by the ends of the rod I in the guide-way grooves. The block is turned through an arc of about one-fourth of a circle against the saws C C, until it passes beyond them, when it is disconnected by the lever M, and the "let-off" stop $f$.

The carriage may be reversed, then, by simply pulling the handle of the lever M back with the hand, and the same operation repeated.

It is evident that trays of various patterns and sizes may be sawed out in nests from a solid block of wood, by simply changing the curve of the guide-ways.

After removing the rough trays from the carriage, it is necessary to dress them thinner at the sides than at the ends, to avoid checking of the wood while drying.

It is also evident that by employing a different carriage, wooden gutters, &c., may be cut out of solid sticks in nests, thereby working a considerable economy of material.

It is further evident that the operation of the machine will not depend upon the number of saws employed in the gang.

Having thus described my invention, what I claim as new, is—

1. The carriage J, mounted upon the free rotating shaft G, in combination with the guide-plates H H' and guide-pin I, or the equivalents of these parts, to give the said carriage a combined rotary and rectilinear movement, substantially as and for the purpose described.

2. In combination with the carriage J, constructed and operated substantially as described, the concentric saws C C, fixed upon a single vibrating head-block, D, and placed, the one directly under the other, so that the bolt may move to the saws in a curved line, without causing the saws to cramp each other.

3. In combination with the free shaft G, guide-plates H H', and guide-pin I, or their equivalents, the wheel L, provided with the pins $e\ e$, and the lever M and let-off $f$, substantially as and for the purpose described.

HENRY BARBER.

Witnesses:
W. N. GRANT,
CHAS. S. STETSON.